(12) United States Patent
Hartog et al.

(10) Patent No.: US 7,504,618 B2
(45) Date of Patent: Mar. 17, 2009

(54) DISTRIBUTED SENSING IN AN OPTICAL FIBER USING BRILLOUIN SCATTERING

(75) Inventors: Arthur H. Hartog, Winchester (GB); Gareth P. Lees, Southampton (GB)

(73) Assignees: Schlumberger Technology Corporation, Sugar Land, TX (US); BP Exploration Operating Company Limited, Middlesex (GB)

( * ) Notice: Subject to any disclaimer, the term of this patent is extended or adjusted under 35 U.S.C. 154(b) by 0 days.

(21) Appl. No.: 11/772,997

(22) Filed: Jul. 3, 2007

(65) Prior Publication Data

US 2009/0008536 A1 Jan. 8, 2009

(51) Int. Cl.
G01J 1/42 (2006.01)
G01N 21/00 (2006.01)
G01B 11/16 (2006.01)

(52) U.S. Cl. ............... 250/227.14; 356/73.1; 356/32

(58) Field of Classification Search ............ 250/227.14, 250/227.18; 356/73.1, 44, 32, 342; 340/854.1, 340/55, 556, 557, 626; 374/131, 161
See application file for complete search history.

(56) References Cited

U.S. PATENT DOCUMENTS

| | | | |
|---|---|---|---|
| 4,767,219 A * | 8/1988 | Bibby | ............... 374/123 |
| 5,592,282 A | 1/1997 | Hartog | |
| 6,335,788 B1 | 1/2002 | Uchiyama et al. | |
| 6,555,807 B2 * | 4/2003 | Clayton et al. | ......... 250/227.16 |
| 6,823,265 B2 | 11/2004 | Haldorsen | |
| 7,000,696 B2 | 2/2006 | Harkins | |
| 7,140,435 B2 | 11/2006 | Defretin et al. | |
| 7,170,590 B2 * | 1/2007 | Kishida | ............... 356/32 |
| 7,187,620 B2 | 3/2007 | Nutt et al. | |
| 7,228,900 B2 | 6/2007 | Schultz | |
| 2007/0062696 A1 | 3/2007 | Wilson | |
| 2007/0171402 A1 * | 7/2007 | Watley et al. | ............... 356/73.1 |

FOREIGN PATENT DOCUMENTS

GB 2409871 A 7/2005

OTHER PUBLICATIONS

Horiguchi, T., et al., "Development of a distributed sensing technique using brillouin scattering", Journal of Lightwave Technology, 1995. 13(7): p. 1296.

(Continued)

*Primary Examiner*—Georgia Y Epps
*Assistant Examiner*—Jennifer Bennett
(74) *Attorney, Agent, or Firm*—Trop, Pruner & Hu, P.C.; Daryl R. Wright; Tim Curington (57) ABSTRACT

To perform distributed sensing with an optical fiber using Brillouin scattering, a light pulse is transmitted into the optical fiber, where the transmitted light pulse has a first frequency. Backscattered light and optical local oscillator light are combined, where the backscattered light is received from the optical fiber in response to the transmitted light pulse, and where the optical local oscillator light has a second frequency. A frequency offset is caused to be present between the first frequency of the transmitted light pulse and the second frequency of the optical local oscillator light, where the frequency offset is at least 1 GHz less than a Brillouin frequency shift of the backscattered light. Spectra representing Stokes and anti-Stokes components of the backscattered light are acquired, where the Stokes and anti-Stokes components are separated by a frequency span that is based on the frequency offset.

31 Claims, 5 Drawing Sheets

OTHER PUBLICATIONS

Lees, G.P., et al., "Advances in optical fiber distributed temperature sensing using the Landau-Placzek ratio", IEEE Photonics Technology Letters, 1998. 10(1): p. 126-128.

Shimizu, K., et al., "Coherent self-heterodyne detection of spontaneously Brillouin-scattered light waves in a single-mode fiber", Optics Letters, 1993. 18(3): p. 185-7.

Izumita, H., et al., "Brillouin OTDR employing optical frequency shifter using side-band generation technique with high-speed LN phase-modulator", IEEE Photonics Technology Letters, 1996. 8(12): p. 1674-6.

Feced, R., et al., "Power measurement of noise-initiated Brillouin scattering in optical fibers for sensing applications", Optics Letters, 1998. 23(1): p. 79-81.

* cited by examiner

FIG. 7 ic field that is used to produce
DISTRIBUTED SENSING IN AN OPTICAL FIBER USING BRILLOUIN SCATTERING

TECHNICAL FIELD

The invention relates to performing distributed sensing with an optical fiber using Brillouin scattering, in which a frequency offset within a predetermined range is defined between a frequency of a light pulse launched into the optical fiber and a frequency of an optical local oscillator.

BACKGROUND

An optical time domain reflectometry (OTDR) technique can be used to measure values of a physical parameter of interest along an optical fiber. In one application, the optical fiber can be deployed in a wellbore that is used to produce fluids from a reservoir in a subterranean structure, where the reservoir can include hydrocarbons, fresh water, and so forth. Examples of physical parameters that may be of interest include temperature, strain, and other parameters. One type of OTDR technique is the Brillouin OTDR technique, which involves measurements based on Brillouin scattering.

In an optical fiber, Brillouin scattering is an inelastic phenomenon that results from the interaction of incident optical photons (of an incident optical signal) with acoustic phonons in the medium (the optical fiber). This interaction induces a counter-propagating optical wave (reflected or backscattered optical signal) having a frequency (Brillouin frequency) that is shifted from the frequency of the original incident optical wave. Brillouin scattering in an optical fiber is sensitive to both temperature and strain changes in the optical fiber.

A Brillouin backscattered optical signal can have two different components: a Stokes line and an anti-Stokes line. The Stokes and anti-Stokes lines are components of the backscattered optical signal centered on different wavelengths (where the Stokes line is centered on a longer wavelength than the anti-Stokes line). Many conventional Brillouin reflectometer configurations provide only one of the Stokes and anti-Stokes lines, or provide both the Stokes and anti-Stokes lines at the same frequency. In the former case, limited information is available. In the latter case, the contribution from each of the Brillouin Stokes and anti-Stokes lines cannot be assessed individually, which may limit flexibility and accuracy.

SUMMARY

In general, according to an embodiment, a method of performing distributed sensing with an optical fiber using Brillouin scattering includes transmitting a light pulse into the optical fiber, where the light pulse has a first frequency. Backscattered light and optical local oscillator light are combined, where the backscattered light is received from the optical fiber in response to the transmitted light pulse, and the optical local oscillator light has a second frequency. A frequency offset is caused to be present between the first frequency of the transmitted light pulse and a second frequency of the optical local oscillator light, where the frequency offset is at least 1 GHz less than a Brillouin frequency shift of the backscattered light. Spectra representing Stokes and anti-Stokes components of the backscattered light are acquired, where the Stokes and anti-Stokes components are separated by a frequency span that is based on the frequency offset.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Techniques and apparatus are provided for distributed sensing based on optical time-domain reflectometry (OTDR). Although reference is made to OTDR, note that techniques according to some embodiments can also be applied to optical frequency-domain reflectometry (OFDR).

The OTDR technique employed according to some embodiments is the Brillouin OTDR technique in which separate spectra are provided for the Stokes and anti-Stokes Brillouin lines, which are components of Brillouin backscattered optical signals centered at the Stokes and anti-Stokes wavelengths. The separate spectra for the Brillouin Stokes and anti-Stokes lines are achieved by separating the frequencies of the Stokes and anti-Stokes lines. By separating the Brillouin Stokes and anti-Stokes lines, each of the lines can be assessed individually. This is useful when high optical power is used to launch optical signals into an optical fiber to achieve a high signal-to-noise ratio in the optical fiber (to provide improved detection capability). Although the Stokes and anti-Stokes lines are separated, note that an operator can decide to use just one of the Stokes and anti-Stokes lines for performing distributed sensing using an optical fiber.

The ability to measure each Brillouin line separately allows an operator to determine the onset of non-linear optical effects, with one such non-linear optical effect being stimulated Brillouin scattering. With stimulated Brillouin scattering, the Stokes line grows relative to the anti-Stokes line. As a result of stimulated Brillouin scattering, the signal at the Stokes wavelength becomes significantly greater than it would be without non-linear effects, which can distort measurements.

By being able to measure each Brillouin line separately, such non-linearity can be detected and corrected based on knowledge of the anti-Stokes/Stokes ratio of the Brillouin lines. By using techniques according to some embodiments, the spectra of the Brillouin backscattered signals can be measured in a higher power regime than is possible with conventional techniques by monitoring both the Brillouin Stokes and anti-Stokes lines independently, while at the same time using coherent light detection for improved sensitivity.

A coherent Brillouin reflectometer according to some embodiments includes a coherent light source (e.g., a laser)

that produces coherent light, from which optical pulses (also referred to as "probe" optical pulses) can be generated for transmission into a target (or sensing) optical fiber. The same light source (or a separate light source coherently related to the first light source) provides an optical local oscillator. An optical local oscillator produces light under control of a user or operator for mixing with received light (in this case backscattered light from the target optical fiber).

The frequency of a probe optical pulse and the frequency of light provided by the optical local oscillator are set to be different by some frequency offset. This frequency offset is some predetermined amount (e.g., greater than or equal to one gigahertz or GHz) less than the Brillouin frequency shift, which refers to the shift in frequency of the Brillouin backscattered light with respect to the optical pulse transmitted into the target optical fiber. Note that the Brillouin frequency shift for the Stokes line is a downshift; in other words, the frequency of the Brillouin backscattered light is shifted downwardly with respect to the frequency of the optical pulse launched into the target optical fiber. The anti-Stokes line is up-shifted to a higher frequency by the Brillouin frequency shift.

In some embodiments, the frequency offset between the probe optical pulse and optical local oscillator light is between 30 megahertz (MHz) and 5 GHz. In an alternative embodiment, the frequency offset can be between 30 MHz and 1 GHz. Such frequency offsets are contrasted to a Brillouin shift of about 11 GHz for coherent light having a wavelength of 1550 nanometers (nm). The Brillouin frequency shift can depend on different optical fiber designs. Assuming 1550 nm illumination, the Brillouin frequency shift can vary over 10-12 GHz (approximately). The low end (30 MHz) of the frequency offset range is based on the line width of the spontaneous Brillouin scattering. Even with an infinitely narrow probe spectrum, the full width, half maximum spectral width of the backscatter is about 30 MHz. Since the goal according to some embodiments is to separate the Stokes and anti-Stokes lines, this number (30 MHz) can be used as the minimum frequency offset between the probe optical pulse and the optical local oscillator light. The upper end of the frequency offset range depends on the capabilities of the detection circuitry; higher frequency offsets means that detection circuitry having wider frequency ranges may have to be employed.

As noted above, the upper end of the frequency offset range can be 1 GHz, in one example embodiment. The 1 GHz number is based on the maximum variation one would expect of the frequency due to a change in the measurand (e.g., temperature, strain). The 1 GHz number corresponds, for example, to a strain of 2% or a temperature change of 1,000° C., enough in either case to exceed the limitations of the optical fiber.

More generally, instead of specifying a particular frequency offset range, the frequency offset can be a frequency value that is at least 1 GHz less than the Brillouin frequency shift of the backscattered light. The frequency offset is less than the Brillouin frequency shift of the backscattered light to reduce the frequency range that has to be scanned by a receiver. However, the frequency offset should be large enough to distinguish the Brillouin peaks associated with the Brillouin Stokes and anti-Stokes lines.

Figure 1:
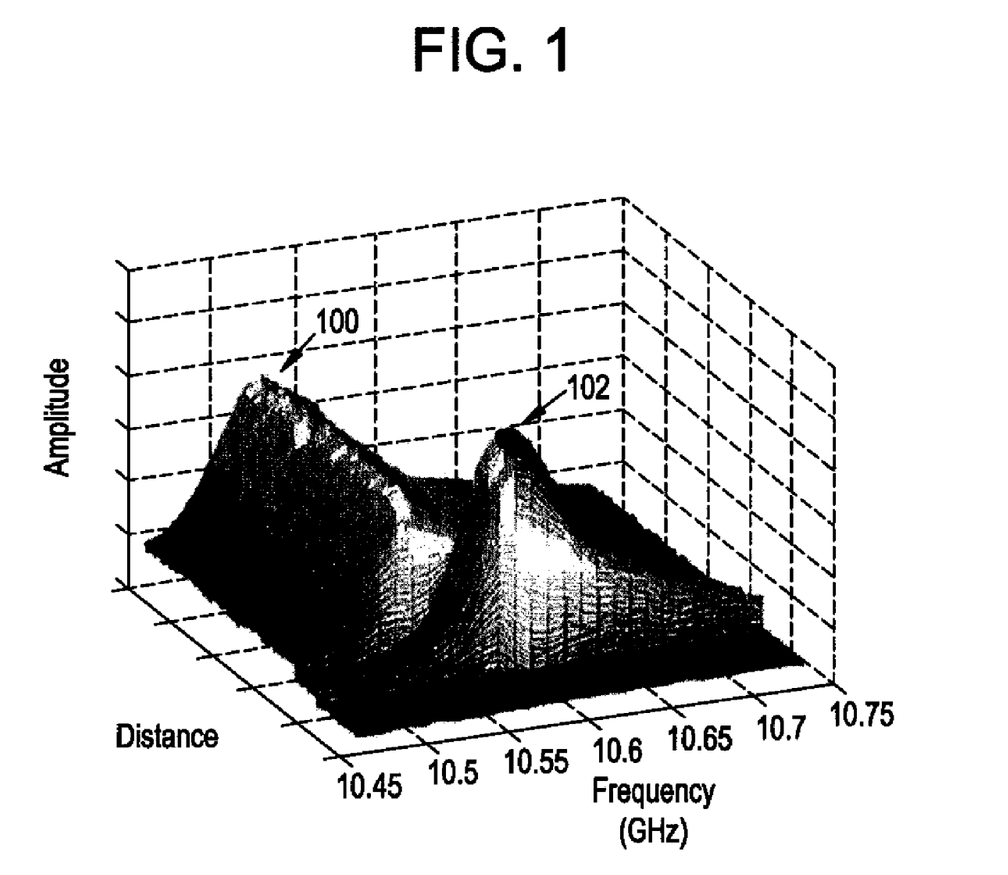
FIG. 1 is a graph that illustrates the intensity of Brillouin backscattered signals against both frequency and distance, where the graph is produced according to an embodiment.

FIG. 1 illustrates a graph that depicts the amplitude (intensity) of a Brillouin signal against both Brillouin frequency shift and distance along the optical fiber. As depicted in FIG. 1, two peaks 100, 102 of the Brillouin backscattered optical signal are depicted. FIG. 1 shows one of the Stokes and anti-Stokes lines (in FIG. 1, both are overlapped) as a function of distance along the fiber. The peak 100 illustrates the intensity of the Brillouin backscattered signal along the fiber up to a certain distance, and the peak 102 illustrates the intensity over a further distance. The peak 102 is shifted with respect to the peak 100 because the temperature of these two sections of fiber are different.

The general shape of each Brillouin line (Stokes line and anti-Stokes line) is nominally Lorentzian at low power. At high frequencies, as depicted in FIG. 1, there are a number of sub-peaks. FIG. 1 illustrates that the choice of frequency separation may depend on the specific optical fiber used and that the tails of the distribution can extend over more than 100 MHz.

Figure 2:
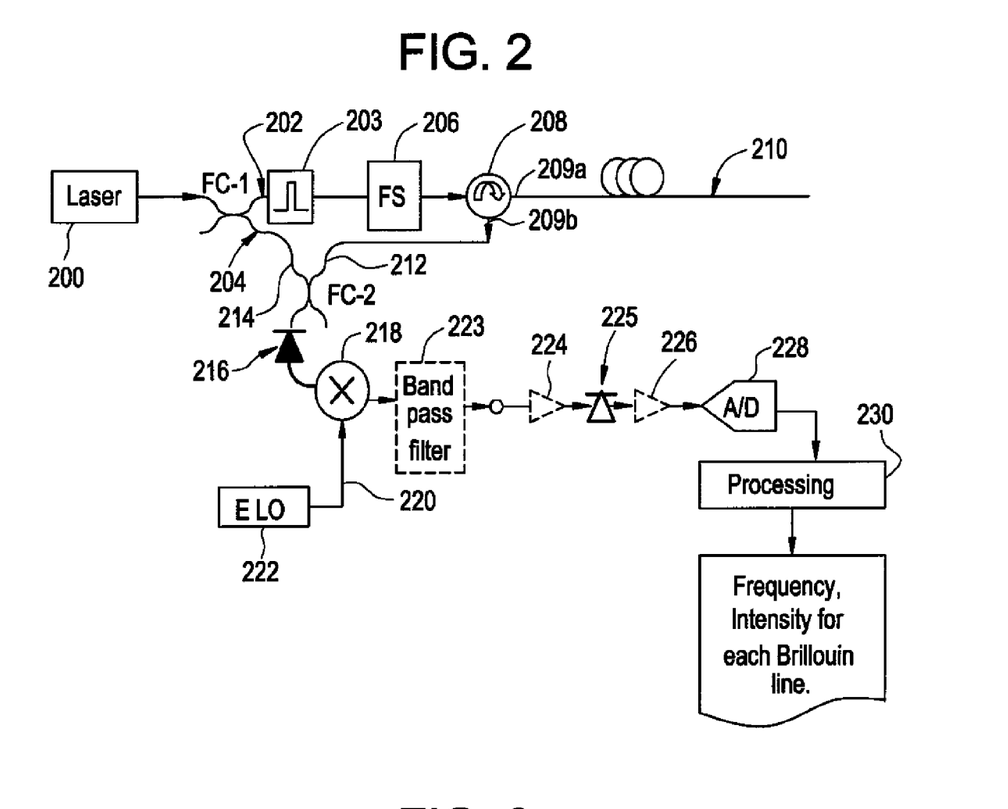
FIG. 2 is a block diagram of an example Brillouin reflectometer and associated processing circuitry, in accordance with an embodiment.

FIG. 2 illustrates an example coherent Brillouin reflectometer (and associated processing circuitry) according to an embodiment. A coherent light source 200 (e.g., laser source) produces coherent light that is propagated towards a first fiber coupler FC-1 (which is a beam splitter), which is an optical coupling device. The laser source 200 provides a continuous light output, which is split at the first fiber coupler FC-1 into two paths 202 and 204. The first path 202 is a probe path over which light for transmission into a target optical fiber 210 is propagated. The second path 204 (optical local oscillator path) is a mixing path to allow light in the second path 204 to be mixed with returned light (backscattered light) that is responsive to the probe light transmitted into the target optical fiber 210. The probe path 202 includes a pulse modulator (optical pulse generator) 203 that extracts a series of optical pulses from the continuous output of the laser source 200. The optical pulses have a desired repetition frequency, pulse duration and power, suitable for probing the target optical fiber 210 to obtain Brillouin backscatter.

The probe path 202 also includes a frequency shifter 206 that changes the frequency of light (in this case the optical pulses output from the optical pulse generator 203) in the probe path 202. The frequency-shifted optical pulses are launched or transmitted into the target optical fiber 210 through an optical coupler or an optical circulator 208 (the latter being illustrated in FIG. 2). The circulator 208 has a first port 209a connected to the target optical fiber 210. Instead of using an optical circulator, other devices can be used instead, such as optical splitters or active devices (e.g., acousto-optic deflectors).

The target optical fiber 210 is used for detecting a desired physical parameter, such as a temperature or strain parameter. In one implementation, the target optical fiber 210 can be deployed in a wellbore that is used for producing desired fluids from a reservoir, such as a hydrocarbon reservoir, a fresh water aquifer, and so forth. The target optical fiber 210 when deployed in such a wellbore provides a distributed sensor that allows for detection of a parameter of interest (e.g., temperature or other parameter of interest) associated with the wellbore. In other implementations, the optical fiber 210 can be deployed in a different application.

The frequency shifter 206 shifts the frequency of the optical pulses generated by the pulse modulator 203 by a predetermined frequency offset (within a predetermined frequency offset range, as discussed above). Thus, if the frequency of the coherent light generated by the laser source 200 is $f_0$, then the optical pulses transmitted by the frequency shifter 206 into the optical fiber 210 has a frequency $f_0 + \Delta f$, where $\Delta f$ represents the frequency offset caused by the shift in frequency performed by the frequency shifter 206.

Backscattered light returning from the optical fiber 210 is directed back to the first port 209a of the circulator 208. The circulator 208 directs the backscattered light to a second port 209b of the circulator 208. The second port 209b is connected to a first input 212 of a second optical or fiber coupler FC-2 (beam combiner), which is an optical coupling device. The second input 214 of the fiber coupler FC-2 receives light from the second optical path 204 (optical local oscillator path) that is at the output of the first fiber coupler FC-1.

Although the optical local oscillator path 204 is depicted as sharing the same laser source 200 as the probe path 202, it is noted that in an alternative embodiment, a separate coherent light source can be used to provide light in the local oscillator path 204, provided that the second coherent light source is coherently related to the laser source 200. A first light source is coherently related to a second light source if there is a predictable relationship between the frequency and the phase of the first and second light sources. For example, the first and second light sources can be at the same frequency or have a fixed frequency offset or even a variable offset that is known.

The probe optical pulses that are transmitted into the optical fiber 210 cause reflection or backscattering (more specifically Brillouin backscattering) to produce reflected or backscattered light that depends upon characteristics of the optical fiber 210, which characteristics are affected by such physical parameters as temperature, strain, and so forth. The backscattered light is propagated by the circulator 208 towards the input 212 of the second fiber coupler FC-2. The frequency of the backscattered light received by the second fiber coupler FC-2 is $f_0+\Delta f$ (the frequency of the transmitted optical pulses launched into the optical fiber 210) less the downshifting caused by the Brillouin frequency shift, or $f_0+\Delta f-f_B$ (where $f_B$ represents the Brillouin frequency shift), in the case of the Stokes line and $f_0+\Delta f+f_B$ in the case of anti-Stokes line.

The second fiber coupler FC-2 combines the light from the optical local oscillator path 204 (which is at frequency $f_0$) and the backscattered light received at the second input 212 of the fiber coupler FC-2.

The combined light is output from the second fiber coupler FC-2 to an optical detector 216, which converts optical power (received from the output of the fiber coupler FC-2) to electrical power representative of the light incident upon the optical detector 216. The portion of the electrical spectrum thus obtained that is of interest is the Brillouin contribution that is at approximately 11 GHz. The optical detector 216 mixes the two light sources arriving through 214 and 212 through a non-linear process resulting in an output at the difference frequency in the region of 11 GHz.

To detect the Brillouin spectrum in the region of 11 GHz, the output of the optical detector 216 is mixed, by an electrical mixer 218, with an electric signal 220 produced by an electrical local oscillator 222 (which can be a voltage controlled oscillator, for example). The electrical local oscillator 222 provides a reference signal that is mixed with the output signal from the optical detector 216 by the mixer 218 to enable for heterodyne detection of the Brillouin backscattered optical signal. The electrical local oscillator 222 scans (or is varied) over several frequencies, for multiple optical pulses, to provide a measure of the Brillouin intensity as a function of frequency shift. The mixer 218 produces an output electrical signal that has an intermediate frequency $f_i=f_1-f_2$ (between the frequency $f_1$ of the output of the optical detector 216 and a frequency $f_2$ of the electrical signal produced by the electrical local oscillator 222).

The output of the mixer 218 is provided to a band pass filter 223 to remove unwanted frequency components, such as due to noise. The filtered signal is then provided to a first amplifier 224 for amplification. The amplified signal from the first amplifier 224 is provided to an electrical detector 225, which is basically a rectifier to convert the amplified electrical signal having the intermediate frequency $f_i$ from the first amplifier 224 into a baseband signal (a DC signal). The baseband signal can then be amplified by a second amplifier 226, with the amplified signal from the second amplifier 226 provided to an analog-to-digital (A/D converter) 228 to digitize the baseband signal.

It is noted that in FIG. 2, elements 223, 224, and 226, which are indicated in dashed profiles, are optional elements that can be omitted in some implementations.

The digitized output from the A/D converter 228 is provided to a processing circuit 230 (e.g., a microprocessor, microcontroller, digital signal processor, computer, etc.). Based on the information received by the processing circuit 230, the intensity of the backscattered light as a function of Brillouin frequency shift and optical fiber position can be determined, such as according to FIG. 1.

For a given setting (frequency) of the electrical local oscillator 222, the output of the A/D converter 228 is a string of values representing the intensity of the backscattered light at a given frequency offset from the optical local oscillator as a function of time from the launching of the probe pulse. This information can be converted into intensity values as a function of distance along the optical fiber based on knowledge of the group velocity in the optical fiber 210. By varying the frequency of the electrical local oscillator 222 (scanning different frequencies), further traces can be acquired with different frequency offsets such that a graph according to FIG. 1, for example, can be built.

Figure 3:
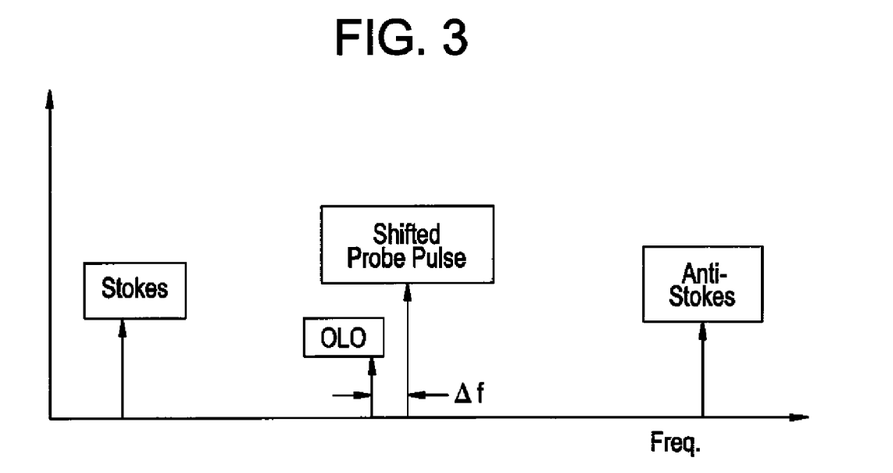
FIG. 3 is a graph that illustrates the separation of the Brillouin Stokes and anti-Stokes lines with respect to the frequency of the probe pulse, according to an embodiment.

The frequency offset $\Delta f$ between the optical local oscillator light and the probe pulse (as shifted in frequency by the frequency shifter 206) has the effect of splitting the electrical spectra corresponding to the two Brillouin lines (the Stokes and anti-Stokes lines) according to FIG. 3, which is a graph that illustrates different frequencies of various signals. Because of the frequency offset $\Delta f$ between the optical local oscillator light and the shifted probe pulse, as depicted in FIG. 3, the Brillouin Stokes and anti-Stokes lines are separated at two different frequencies, as also illustrated in FIG. 3. The Brillouin lines are naturally symmetric about the probe frequency. Since the optical local oscillator is at a slightly different frequency than the frequency of the shifted probe pulse (different by $\Delta f$), the frequency separation between the Stokes line and the optical local oscillator will differ from the frequency separation between the anti-Stokes line and the optical local oscillator by $2\times\Delta f$. As a result of the mixing process, the two Brillouin lines will be spaced apart by a frequency span of $2\times\Delta f$.

In the example of FIG. 3, where the probe pulse is shifted up in frequency relative to the optical local oscillator, the anti-Stokes line will have the higher frequency of the two Brillouin lines. Knowing the frequency offset, $2\times\Delta f$, the Brillouin lines can readily be identified provided the range of the frequency scan of the electrical local oscillator 222 is broad enough to cover both the frequencies of the Brillouin lines.

Note that scanning over multiple frequencies by the electrical local oscillator 222 involves a penalty on acquisition time. The temperature and strain coefficients of the Brillouin frequency are of order 1.05 MHz/° C. and 46 KHz/µε, for example, thus allowing for a temperature range of 200° C. and a strain range of 1%; as a result, a total frequency span of order 800 MHz (allowing for the tails of the distribution) is required. If the frequency separation of the peaks is 160 MHz (i.e., $\Delta f=80$ MHz), which is more than sufficient to separate the peaks for any interpretation software, then this can add 20% to the acquisition time. In practice smaller frequency offsets can be accommodated.

In an alternative embodiment, instead of performing the frequency shift in the probe path 202, the light in the probe path can remain un-shifted. However, the light in the optical local oscillator path 204 can have its frequency shifted by using a frequency shifter similar to 206. Shifting the frequency of the optical local oscillator path 204 also can provide the desired frequency offset Δf between the probe pulse and the optical local oscillator light. As yet another alternative, frequency shifting in the optical local oscillator path 204 can be combined with shifting in the probe path to provide an effective frequency offset Δf. For example, if the frequency shift in the probe path is +110 MHz (frequency shifted upwardly by 110 MHz), and the frequency shift in the optical local oscillator path is +80 MHz (frequency shifted upwardly by 80 MHz), the net effective Δf is 30 MHz (resulting in 60 MHz separation of the Brillouin Stokes and anti-Stokes lines).

Variants of the OTDR reflectometer shown in FIG. 2 can be employed in other embodiments. For example, the frequency shifter 206 and pulse modulator 203 of FIG. 2 can be combined into a single device, such as an acousto-optic module (AOM). Alternatively, a modulator that does not shift the frequency, such as an electro-optic modulator can be used, followed by a frequency shifter. In this case, since the frequency shifter is not required to switch quickly, its drive frequency can be relatively low.

In another alternative variant, two AOM devices can be used, where a first AOM device is used to shift up the frequency and the other AOM device is used to shift down the frequency, with each AOM operating at a different drive frequency. For example, if the first AOM is operated at 175 MHz, and the second AOM is operated at 110 MHz, then Δf is 65 MHz and the Brillouin lines are consequently separated by 130 MHz (2×Δf).

In yet another alternative, the frequency offset can be increased by using two AOMs in tandem, each shifting the frequency in the same direction.

Figure 4:
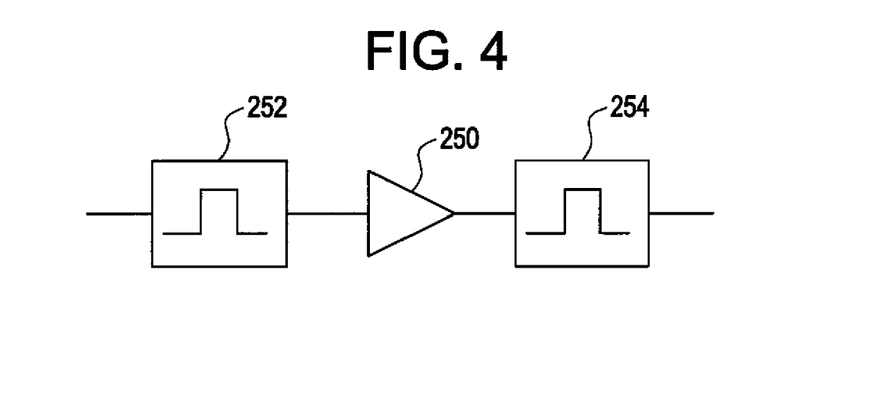
FIG. 4 illustrates a circuit to amplify light and to produce light pulses, according to an embodiment.

If it is desirable to increase the launch power as much as possible, within the bounds of non-linear power limits, then an optical amplifier can be added to the probe path 202 of FIG. 2. In one example, the optical amplifier is an erbium-doped fiber amplifier. In this case, as depicted in FIG. 4, an optical amplifier 250 can be placed between two pulse modulators 252 and 254 in the probe path. Placing the optical amplifier 250 between two modulators allows not only the frequency offset Δf to be adjusted over a wide range, but also, by pulsing both modulators 252 and 254, to suppress any spurious output, such as amplified spontaneous emission of the amplifier between pulses.

Figure 5:
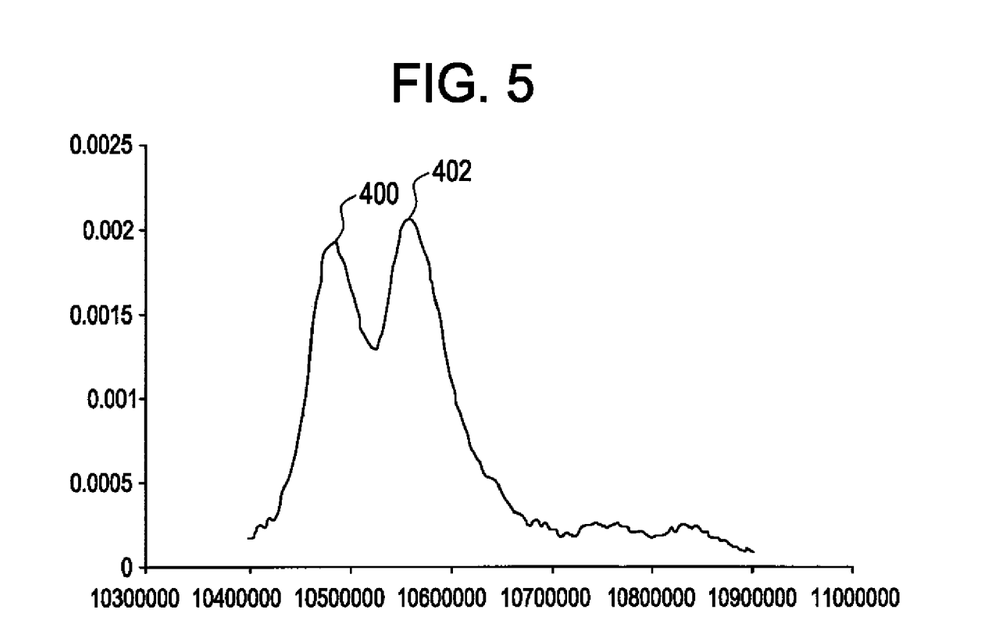
FIGS. 5-7 are graphs that illustrate separation of Stokes and anti-Stokes components at different frequency offsets between a probe optical pulse and optical local oscillator light.

The following provide examples of separation of the Brillouin lines using some implementations in accordance with an embodiment. FIG. 5 shows an example in which a 40 MHz downshift in frequency is provided in the optical local oscillator path 204 in FIG. 2 (while the probe path has zero frequency shift). In the graph provided in FIG. 5, the separation between peaks 400 and 402 (which correspond to the Brillouin Stokes and anti-Stokes lines, respectively) is about 80 MHz.

Figure 6:
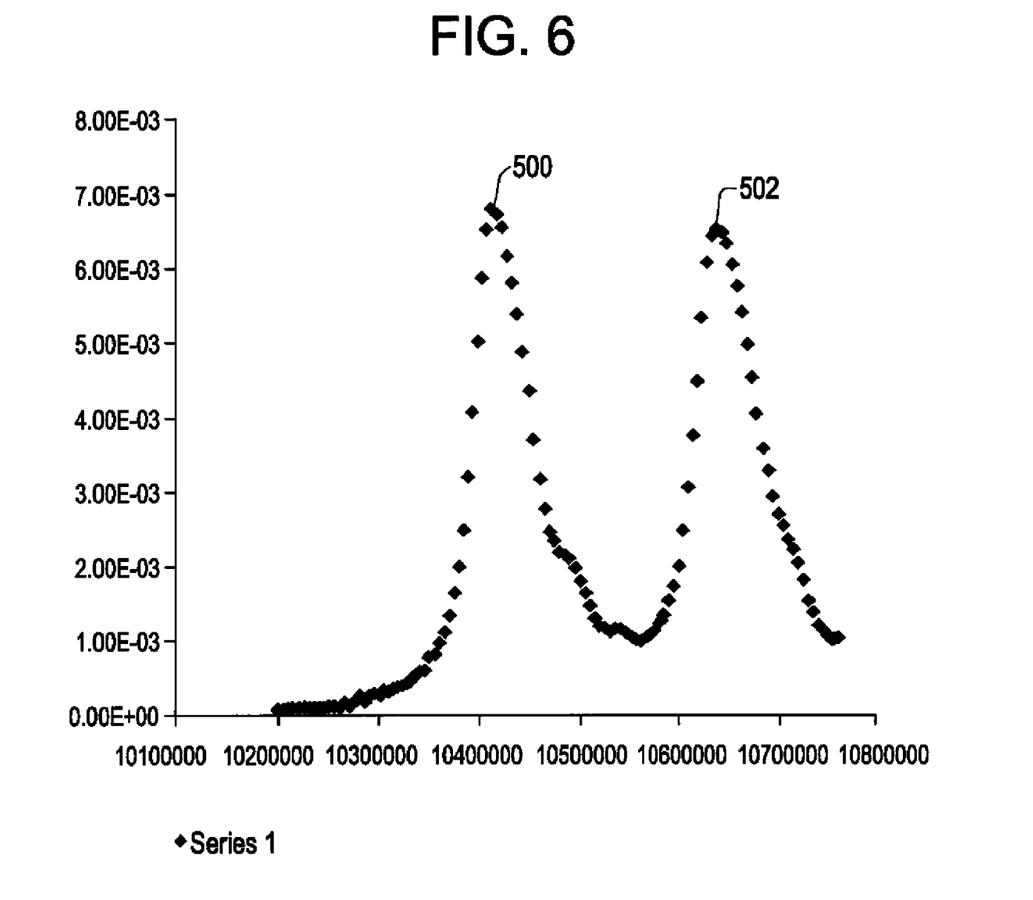

FIG. 6 is a graph showing use of a different frequency shift in the optical local oscillator, which is about 110 MHz (a downshift of the frequency). In this example, the peaks 500 and 502 (corresponding to the Stokes and anti-Stokes Brillouin lines, respectively) are separated by a larger frequency span, in this case about 220 MHz.

Note that the amount of overlap between the peaks 500 and 502 is less than the amount of overlap between peaks 400 and 402 in FIG. 4.

Figure 7:
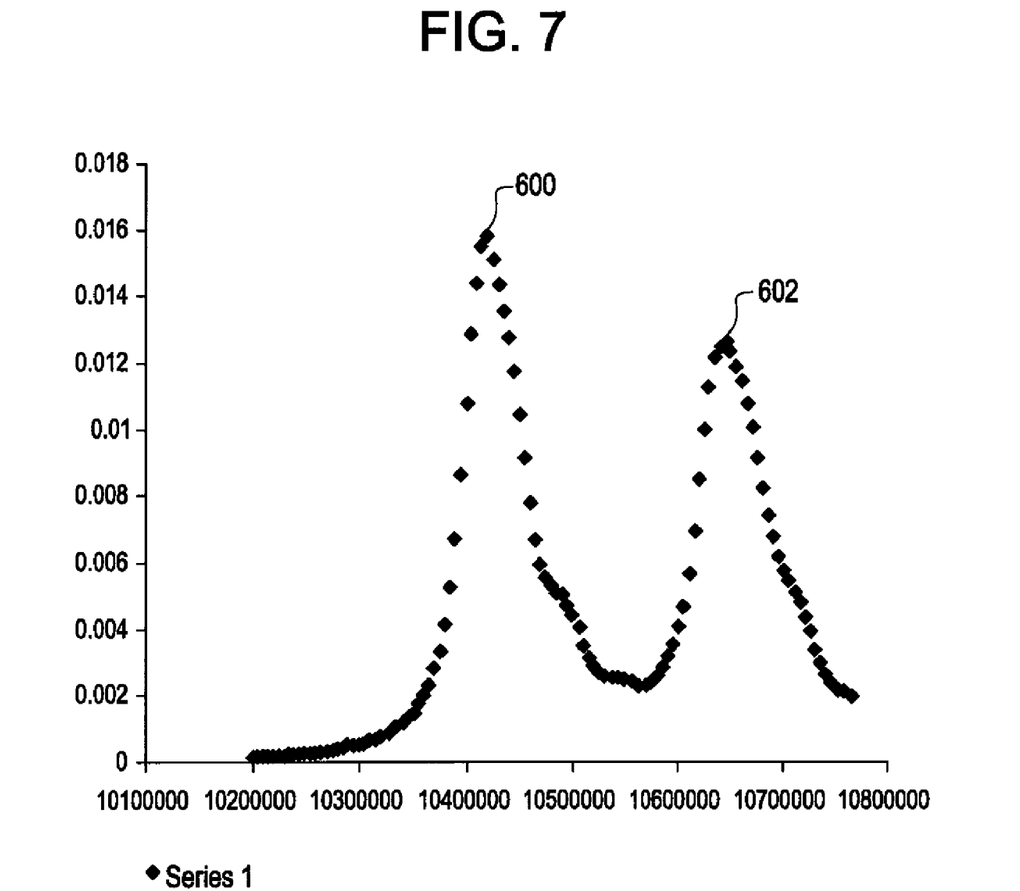

FIG. 7 shows a graph using the same frequency offset as in FIG. 6, except that the probe power is approximately doubled. As a result of doubling the probe power, the ratio of the intensities of the two peaks 600 (corresponding to the Stokes line) and 602 (corresponding to the anti-Stokes line) has changed with respect to the ratio depicted in FIG. 6. This is due to the fact that at higher power, the intensity of the Brillouin Stokes line grows with respect to the intensity of the Brillouin anti-Stokes line, which is due to the non-linear relationship that exists in the higher power regime.

By tracking the ratio of the Stokes and anti-Stokes lines, an operator can discover the extent to which non-linear conversion is occurring. By monitoring the ratios, probe launch power can be optimized by adjusting the power so as to maximize the anti-Stokes power, to use a probe power where losses due to non-linear conversion of the probe signal to a Stokes component just offsets the increased power that is launched into the optical fiber. Note that at high power, a portion of the probe pulse may be converted to the wavelength of the Stokes component, which causes the signal at the Stokes wavelength to be significantly greater than the signal at the anti-Stokes wavelength. By being able to monitor the Stokes and anti-Stokes components individually, due to the frequency separation of 2Δf, an operator is able to assess the point at which non-linear effects start to appear.

At this optimal power point, the intensity measurement of the anti-Stokes line is still linear with respect to the probe power, such that heterodyne-detection Brillouin OTDR can be implemented, such as according to techniques described in U.S. Pat. No. 5,592,282.

In accordance with some embodiments, an operator has the choice of selecting just the anti-Stokes line, which is always proportional to the probe energy and to the Rayleigh backscatter. In this way, the Brillouin anti-Stokes line can be normalized by the Rayleigh backscatter to eliminate the effects of losses along the optical fiber. With this arrangement, the power can be increased right up to the threshold of stimulated Brillouin scattering without distortion of the anti-Stokes/Rayleigh ratio.

Moreover, the ratio of Stokes and anti-Stokes intensities provides a measure of the Brillouin gain. This measure allows the Stokes line to be linearized in the context of direct-detection Brillouin OTDR. In this case, the Brillouin Stokes line can also be used, thus providing a separate measure of Brillouin intensity and frequency shift. While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of performing distributed sensing with an optical fiber using Brillouin scattering, comprising:
   transmitting a light pulse into the optical fiber, wherein the transmitted light pulse has a first frequency;
   combining backscattered light and optical local oscillator light, wherein the backscattered light is received from the optical fiber in response to the transmitted light pulse, and wherein the optical local oscillator light has a second frequency;
   causing a frequency offset to be present between the first frequency of the transmitted light pulse and the second frequency of the optical local oscillator light, wherein the frequency offset is at least 1 GHz less than a Brillouin frequency shift of the backscattered light;
   acquiring spectra representing Stokes and anti-Stokes components of the backscattered light, wherein the Stokes and anti-Stokes components are separated by a frequency span that is based on the frequency offset; and outputting representations of the Stokes and anti-Stokes components to enable display of the Stokes and anti-Stokes components.

2. The method of claim 1, wherein causing the frequency offset comprises performing a frequency shift of the transmitted light pulse with respect to light generated by a coherent light source.

3. The method of claim 1, wherein causing the frequency offset comprises performing a frequency shift of the optical local oscillator light.

4. The method of claim 1, wherein combining the backscattered light and the optical local oscillator light is performed using an optical coupling device.

5. The method of claim 4, further comprising providing a combined signal from the optical coupling device that is a combination of the backscattered light and the optical local oscillator light to at least one optical detector, wherein the at least one optical detector produces an electrical output that is indicative of the combined light.

6. The method of claim 5, further comprising:
using an electrical mixer to mix the electrical output of the optical detector and a reference signal of an electrical local oscillator; and
producing a mixed signal by the electrical mixer that has an intermediate frequency between a frequency of the reference signal and a frequency of the electrical output of the optical detector.

7. The method of claim 6, further comprising varying, over multiple transmitted light pulses, a frequency of the electrical local oscillator to provide a measure of Brillouin intensity as a function of frequency.

8. The method of claim 1, wherein causing the frequency offset to be present between the first frequency and the second frequency comprises causing the frequency offset to have a frequency value in a range between 30 MHz and 5 GHz.

9. The method of claim 1, further comprising using one of the Stokes and anti-Stokes components of the backscattered light to perform distributed sensing with the optical fiber.

10. The method of claim 1, wherein the first and second frequencies are coherently related.

11. The method of claim 1, wherein transmitting the light pulse into the optical fiber is based on light from a first light source, and wherein the optical local oscillator light is from a second light source that is coherently related to the first light source.

12. A method of performing distributed sensing with an optical fiber using Brillouin scattering, comprising:
transmitting a light pulse into the optical fiber, wherein the transmitted light pulse has a first frequency;
combining backscattered light and optical local oscillator light, wherein the backscattered light is received from the optical fiber in response to the transmitted light pulse, and wherein the optical local oscillator light has a second frequency;
causing a frequency offset to be present between the first frequency of the transmitted light pulse and the second frequency of the optical local oscillator light, wherein the frequency offset is at least 1 GHz less than a Brillouin frequency shift of the backscattered light; and
acquiring spectra representing Stokes and anti-Stokes components of the backscattered light, wherein the Stokes and anti-Stokes components are separated by a frequency span that is based on the frequency offset; and
analyzing the Stokes and anti-Stokes components separately to determine when non-linear effects start to appear.

13. The method of claim 12, further comprising determining an onset of stimulated Brillouin scattering based on observed non-linear effects of the Stokes and anti-Stokes components.

14. The method of claim 12, wherein causing the frequency offset to be present between the first frequency and the second frequency comprises causing the frequency offset to have a frequency value in a range between 30 MHz and 1 GHz.

15. The method of claim 12, further comprising producing coherent light from a light source, wherein the light pulse is produced from the coherent light using a pulse modulator.

16. The method of claim 15, further comprising performing a frequency shift of the light pulse produced from the pulse modulator to produce the transmitted light pulse, wherein the frequency shift is performed using a frequency shifter.

17. The method of claim 16, wherein the frequency shifter and the pulse modulator are integrated in an acousto-optic modulator.

18. An apparatus comprising:
first circuitry to produce a light pulse that is transmitted into an optical fiber, wherein the transmitted light pulse has a first frequency;
an optical local oscillator that provides light at a second frequency;
an optical coupling device to combine backscattered light and the optical local oscillator light, wherein the backscattered light is received from the optical fiber in response to the transmitted light pulse,
wherein a frequency offset is present between the first frequency of the transmitted light pulse and the second frequency of the optical local oscillator light, the frequency offset being at least 1 GHz less than a Brillouin frequency shift of the backscattered light; and
a processing circuit to
acquire spectra representing Stokes and anti-Stokes components of the backscattered light, wherein the Stokes and anti-Stokes components are separated by a frequency span that is based on the frequency offset,
detect non-linearity based on a difference between the Stokes and the anti-Stokes components.

19. The apparatus of claim 18, wherein the first circuitry includes a frequency shifter to cause the frequency offset.

20. The apparatus of claim 18, further comprising second circuitry to cause the frequency offset, wherein the second circuitry can cause the frequency offset by adjusting frequency of at least one of the transmitted light pulse and the optical local oscillator light.

21. The apparatus of claim 18, further comprising an optical detector to detect a combined signal that is a combination of the backscattered light and the optical local oscillator light wherein the combined signal is provided by the optical coupling device, and wherein the optical detector produces an electrical output that is representative of the combined signal.

22. The apparatus of claim 21, further comprising an electrical local oscillator to produce a reference signal, and an electrical mixer having a first input to receive the electrical output of the optical detector, and a second input to receive the reference signal of the electrical local oscillator, wherein the electrical mixer produces a mixed signal having an intermediate frequency between a frequency of the electrical output of the optical detector and a frequency of the reference signal of the electrical local oscillator.

23. The apparatus of claim 22, wherein the electrical local oscillator is scanned across multiple frequency settings to enable determination of Brillouin intensity of the backscattered signal as a function of frequency.

24. The apparatus of claim 18, wherein the frequency span between the Stokes and anti-Stokes components is twice the frequency offset.

25. A system comprising
an optical fiber for deployment into a wellbore;
first circuitry to produce a light pulse that is transmitted into the optical fiber, wherein the transmitted light pulse has a first frequency;
an optical local oscillator that provides light at a second frequency;
an optical coupling device to combine backscattered light and the optical local oscillator light, wherein the backscattered light is received from the optical fiber in response to the transmitted light pulse,
wherein a frequency offset is present between the first frequency of the transmitted light pulse and the second frequency of the optical local oscillator light, the frequency offset being at least 1 GHz less than a Brillouin frequency shift of the backscattered light; and
a processing circuit to
acquire spectra representing Stokes and anti-Stokes components of the backscattered light, wherein the Stokes and anti-Stokes components are separated by a frequency span that is based on the frequency offset,
output a visual representation of the Stokes and anti-Stokes components.

26. The system of claim 25, wherein the first circuitry includes a frequency shifter to cause the frequency offset.

27. The system of claim 25, wherein the frequency offset is in a range between 30 MHz and 1 GHz.

28. The system of claim 25, further comprising an electrical local oscillator to produce a reference signal, and an electrical mixer having a first input to receive an electrical signal representing combined light output of the optical coupling device, and a second input to receive the reference signal of the electrical local oscillator, wherein the electrical mixer produces a mixed signal having an intermediate frequency between a frequency of the electrical signal and a frequency of the reference signal of the electrical local oscillator.

29. The system of claim 28, wherein the electrical local oscillator is scanned across multiple frequency settings to enable determination of Brillouin intensity of the backscattered signal as a function of frequency.

30. The apparatus of claim 18, wherein the non-linearity is detected based on tracking a ratio of the Stokes and anti-Stokes components.

31. The system of claim 25, wherein the processing circuit is to further analyze the Stokes and anti-Stokes components separately to determine when non-linear effects appear.

* * * * *